(12) United States Patent
Nakashima

(10) Patent No.: US 11,155,011 B2
(45) Date of Patent: Oct. 26, 2021

(54) METHOD OF INJECTION MOLDING A DISCRETE PART

(71) Applicant: CHUNICHI PRECISION MOLDING, INC., Elmhurst, IL (US)

(72) Inventor: Kota Nakashima, Itasca, IL (US)

(73) Assignee: Chunichi Precision Molding, Inc., Elmhurst, IL (US)

( * ) Notice: Subject to any disclaimer, the term of this patent is extended or adjusted under 35 U.S.C. 154(b) by 254 days.

(21) Appl. No.: 16/265,516

(22) Filed: Feb. 1, 2019

(65) Prior Publication Data

US 2019/0232537 A1    Aug. 1, 2019

Related U.S. Application Data

(60) Provisional application No. 62/625,126, filed on Feb. 1, 2018.

(51) Int. Cl.
*B29C 45/32*    (2006.01)
*B29C 45/04*    (2006.01)
*B29C 45/16*    (2006.01)

(52) U.S. Cl.
CPC ...... *B29C 45/0408* (2013.01); *B29C 45/1615* (2013.01); *B29C 45/1635* (2013.01); *B29C 45/32* (2013.01)

(58) Field of Classification Search
CPC ............ B29C 45/0408; B29C 45/1615; B29C 45/1635; B29C 45/32
See application file for complete search history.

(56) References Cited

U.S. PATENT DOCUMENTS

| | | |
|---|---|---|
| 2,298,365 A | 10/1942 | Gits et al. |
| 4,416,602 A | 11/1983 | Neumeister |
| 4,440,820 A | 4/1984 | Shiho et al. |
| 4,676,941 A | 6/1987 | Shiho et al. |
| 4,726,758 A | 2/1988 | Sekine et al. |
| 4,990,077 A | 2/1991 | Morita |
| 5,049,343 A | 9/1991 | Sorensen |
| 5,094,602 A | 3/1992 | Morita |
| 5,192,481 A | 3/1993 | Morita |
| 5,372,770 A | 12/1994 | Machida |
| 5,562,928 A | 10/1996 | Ando et al. |
| 6,071,454 A | 6/2000 | Shimizu et al. |
| 2014/0077406 A1 | 3/2014 | Okamoto et al. |

OTHER PUBLICATIONS

International Search Report and Written Opinion, dated Apr. 12, 2019 in International Patent Application No. PCT/US19/16350.

*Primary Examiner* — Ryan M Ochylski
(74) *Attorney, Agent, or Firm* — Wood, Phillips, Katz, Clark & Mortimer

(57) ABSTRACT

A method and assembly for injection molding a part. The injection molding assembly has a frame and a core back assembly on the frame with a material controlling region. The core back assembly has first and second states with the material controlling region: i) in a first position with the core back assembly in the first state; and ii) in a second position with the core back assembly in the second state. First and second mold units are configured to be placed in operative relationship on the frame wherein the first and second mold units cooperate to form a mold cavity on the frame. The frame, core back assembly, and first and second mold units are configured so that the state of the core back assembly is changed as an incident of the first and second mold units being placed in the operative relationship.

13 Claims, 4 Drawing Sheets

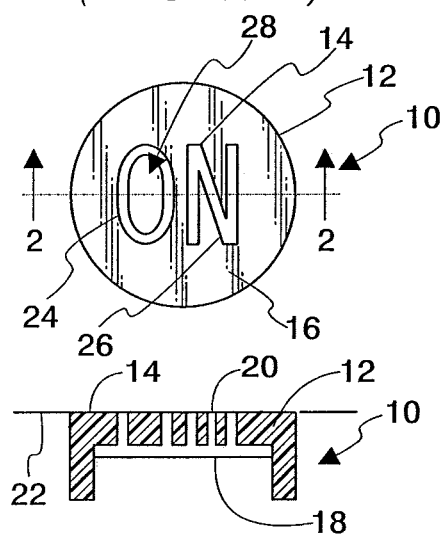
Fig. 1 (PRIOR ART)
Fig. 2 (PRIOR ART)
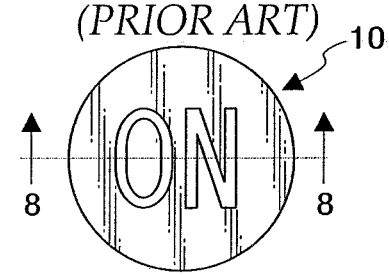
Fig. 7 (PRIOR ART)
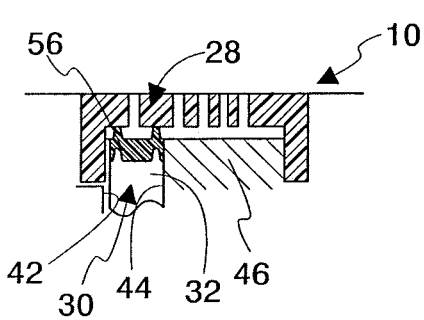
Fig. 8 (PRIOR ART)
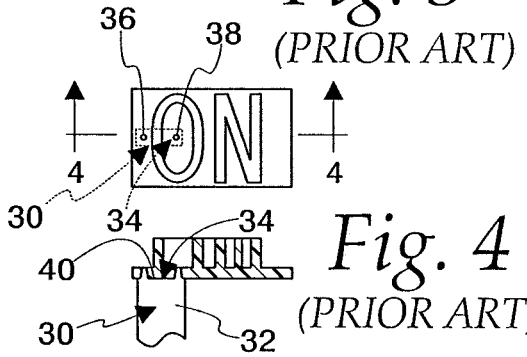
Fig. 3 (PRIOR ART)
Fig. 4 (PRIOR ART)
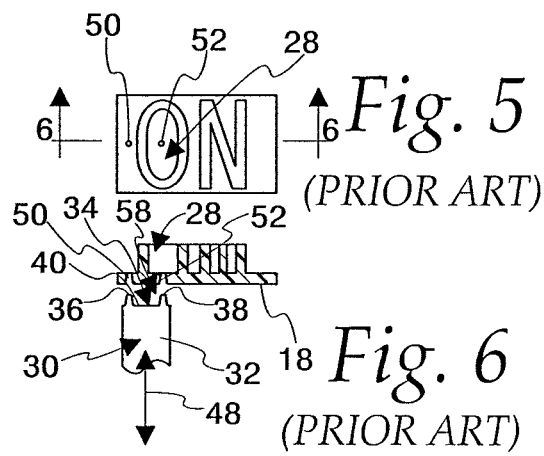
Fig. 5 (PRIOR ART)
Fig. 6 (PRIOR ART)
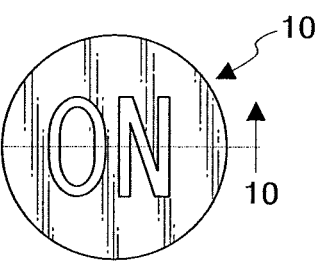
Fig. 9 (PRIOR ART)
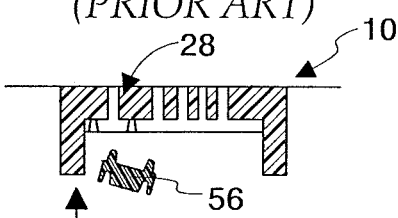
Fig. 10 (PRIOR ART)

METHOD OF INJECTION MOLDING A DISCRETE PART

CROSS-REFERENCE TO RELATED APPLICATIONS

This is a non-provisional application claiming priority to U.S. Provisional Application No. 62/625,126, filed Feb. 1, 2018, which is incorporated herein by reference.

BACKGROUND OF THE INVENTION

Field of the Invention

This invention relates to injection molding and, more particularly, to double-shot/two-shot injection molding. The invention is directed to both a method of injection molding discrete parts and a system/assembly through which the molding can be carried out.

Background Art

Injection molding is practiced to form a multitude of different parts for different applications. A basic molding operation involves injection of a flowable material into a mold cavity defined cooperatively by relatively movable mold parts. Two-shot molding involves twice performing the injection step with materials having different characteristics. Typically, one material is injected into a mold cavity to make an initial portion of a part. The portion of the part is situated in a mold cavity with a different configuration whereupon a second material is injected into the cavity space not occupied by the part portion so as to conform thereto and bond therewith. Typically, but not exclusively, the injectable materials are two plastic resins that form a molecular bond. The completed part is cooled and ejected.

There are many different discrete parts produced through the two-shot injection molding process. One common construction is a discrete part that has exposed areas with contrasting colors. For example, a plastic button used to reposition an actuator may have informational indicia thereon to be viewed by a user. By using contrasting resins, the indicia can be permanently formed within a continuous, smooth surface. With this construction, the indicia are not prone to wearing off and will remain consistently legible even after heavy use and even after the occurrence of abrasion at the contacted surface.

One such exemplary part is shown at 10 in FIGS. 1 and 2. The part 10 is a typical cover button that is pressed upon to actuate some device. This type of part is seen commonly on vehicle dashboards. The part 10 has a body 12 with an exposed surface 14 with a background area 16 upon which the word "ON" appears in a contrasting color/shade.

This type of part is typically made using a two-shot molding process. In one mold cavity a first portion 18 of the discrete part 10 is formed. As depicted, the first portion makes up the unshaded region forming the letters "O" and "N" in FIGS. 1 and 2.

In a second molding step, the material is formed around the first portion 18 to produce the shaded piece shown in FIGS. 1 and 2.

In a typical setup, the first portion 18 is placed in a mold cavity preparatory to injecting the second material such that the top 20 of the first portion 18 is abutted to a mold surface 22 bounding the cavity. The second material, under pressure, flows against and fully around the peripheral surfaces 24, 26 of the letters "O" and "N", respectively. However, the peripheral surface 24, by reason of extending continuously around the inner region 28 of the letter "O", prevents migration of the injected second material into that region 28.

To address this issue, core back assemblies, as shown at 30 in FIGS. 3, 4, 6, and 8, were devised to modify the molding process, as shown in FIGS. 3-10.

The core back assembly 30 has a portion 32 with a material controlling region at 34 that is movable relative to a mold structure between a first position, as shown in FIGS. 3 and 4, and a second position, as shown in FIGS. 6 and 8. With the material controlling region 34 in the first position, the core back assembly 30 is in a first state, and with the material controlling region 34 in its second position, the core back assembly 30 is in its second state.

In this embodiment, the material controlling region 34 has spaced first and second projections 36, 38 and a surface 40 therebetween. The portion 32 of the core back assembly 30 is guided in translation by surfaces 42, 44 on at least one associated mold unit 46 in a path, indicated by the double-headed arrow 48 in FIG. 6, whereby the material controlling region 34 moves between its first and second positions.

As shown in FIGS. 3 and 4, as the first material is injected to form the first part portion 18, the material controlling region 34 is placed in its first position wherein the projections 36, 38 extend into the cavity within which the first portion 18 is formed. The projections 36, 38 are dimensioned so that once the first portion 18 of the discrete part 10 is formed, the projections 36, 38 extend fully therethrough, whereby upon retracting the material controlling region 34 to its second position first and second spaced through openings 50, 52 are formed.

With the first portion 18 thus formed and placed into a second mold cavity configuration, a second molding material is injected. The material controlling region 34 produces a bridge between the first and second openings 50, 52, whereby the second material moves in a path downwardly through the first opening 50, along the bridge surface 40, and into and through the second opening 52 into the region at 28, surrounded by the "O".

Once the second injected component is solidified, a bridge piece 56, made from the second material, fills the void at 58 between the material controlling region 34 and the first portion 18 of the part 10. As shown in FIG. 10, this bridge piece 56 breaks away as the part 10 is separated upon completion.

Further details of the conventional core back assembly 30 are shown incorporated into a molding system 60 in FIG. 11.

The molding system 60 has a frame 62 upon which separate molding stations 64, 66 are provided. The core back assembly 30 has the same construction at each station 64, 66.

At the first molding station 64, the frame 62 supports cooperating first and second mold units 68, 70 shown in an operative relationship on the frame 62, wherein they cooperatively define a first mold cavity 72 configured to form the first portion 18 of the part 10. An elongate body 74 defines the portion 32 with the material controlling region 34 thereon. The body 74 projects upwardly from a platform 76 and is guided in a vertical path relative to the frame 62 as indicated by the double-headed arrow 78. The frame 62 has associated components 80 (one shown) that stably guide movement of the platform 76 and the elongate body 74 thereon in a controlled vertical path.

It should be noted that while the prior art and inventive structures show a "vertical" mold arrangement, this orientation is not required. That is, "vertical" is simply a frame of reference to describe relative component movements, and this characterization should not be viewed as limiting.

The core back assembly 30 has an actuator 82 that is guided vertically relative to the frame 62 in a path indicated by the double-headed arrow 84. A drive 86 translates the actuator 82 upwardly, as indicated by the arrow 88, so as to thereby move the platform 76 upwardly and consistently place the core back assembly 30 in its first state, wherein the material controlling region 34 is in the first position of FIG. 11.

At the second station 66, third and fourth mold units 90, 92 are shown in an operative relationship on the frame 62 wherein they cooperatively define a second mold cavity 94 that receives the first part portion 18 and is complementary to the completed shape of the part 10.

The associated core back assembly 30 has the same construction as the core back assembly 30 at the first molding station 64. A separate drive 96 draws the actuator 82 downwardly, in the direction of the arrow 98, relative to the frame 62 to move the platform 76 and upwardly projecting body 74 to a position wherein the core back assembly 30 is in the second state. The material controlling region 34 is thus situated in the second position as shown more clearly in FIGS. 6 and 8.

As depicted, with the mold units in operative relationship, the state of each core back assembly 30 is independently controlled through the drives 56, 96. The dimension a is the distance between the top 100 of the platform 76 and the bottom 102 of the mold unit 68 at the molding station 64. The corresponding distance b between the top 100 of the platform 76 and the bottom 104 of the mold unit 90 is different by a distance c. This represents the vertical movement of the platforms 100, effected through the drives 86, 96, to change the material controlling regions 34 between their first and second positions, wherein the core back assemblies 30 are respectively in their first and second states.

Accordingly, to operate the molding system 60, specialized equipment must be available to control the state of the core back assembly 30. Whereas the mold units 68, 70, 90, 92 may have a generic construction, it may not be possible to utilize core back assemblies at facilities where such specialized equipment is not available to change the state of each core back assembly. The cost of such equipment may be relatively high. Even if such equipment is available at a site, often there is a dimensional mismatch, which may result from an incompatible design, or poorly controlled tolerances that preclude system operation utilizing the core back assemblies. Thus, the industry has contended with a lack of flexibility in terms of using core back assembly technology.

Alternatively, a self-contained system must be designed with the incorporated ability to operate the core back assembly. This equipment may be expensive and may lack the flexibility to interchangeably use the common generic mold units.

SUMMARY OF THE INVENTION

In one form, the invention is directed to a method of injection molding a discrete part. The method includes the step of obtaining a molding system having at least one frame. At least first and second mold units are configured to cooperate to form two different mold cavity configurations. A core back assembly is on each of the at least one frame and includes a material controlling region. The core back assembly has first and second states with the material controlling region: i) in a first position with the core back assembly in the first state; and ii) in a second position with the core back assembly in the second state. The method further includes the steps of: placing the first and second mold units in a first operative relationship on the one frame, as an incident of which the core back assembly is either changed into or maintained in the first state, and the first and second units define a first mold cavity with a first configuration; injecting a first material into the first mold cavity to form a first portion of the discrete part, wherein the material controlling region defines first and second spaced openings in the first portion of the discrete part; and either: a) placing the first and second mold units in a second operative relationship on the one frame or a second of the at least one frame; or b) placing a third mold unit in an operative relationship with at least one of the first and second mold units and/or a fourth mold unit on the one frame or a second of the at least one frame to thereby define a second mold cavity with a different configuration than the first mold cavity in which at least a part of the first portion of the discrete part resides and as an incident of which the core back assembly is either changed into or maintained in the second state. The method further includes the step of injecting a second material, having a characteristic different than the first material, into the second mold cavity and thereby causing the second material to move in a path between and through the first and second openings to against the first portion of the discrete part at spaced locations.

In one form, the core back assembly has a portion including the material controlling region that moves as one piece. The portion of the core back assembly translates in a path relative to the at least one frame as the core back assembly is changed between the first and second states.

In one form, the material controlling region has first and second projections around which the first material is formed and configured so that the first and second openings extend fully through the first portion of the discrete part.

In one form, the material controlling region in the second state guides the injected second material between the first and second spaced openings in the first portion of the discrete part.

In one form, the first and second materials have different characteristics by reason of having at least one of: a) different colors; and b) different compositions.

In one form, the core back assembly has a first arm on the at least one frame that is guided in pivoting movement relative to the at least one frame around a first axis and a first actuator component. The first actuator component is movable between a starting position and an actuated position. The core back assembly is: a) in the first state with the first actuator component in the actuated position; and b) in the second state with the first actuator component in the starting position. As an incident of the first actuator component changing from the starting position into the actuated position, the first arm pivots in one direction around the first axis and thereby causes the portion of the core back assembly to translate in its path to thereby move the material controlling region from the second position into the first position.

In one form, a subassembly on the core back assembly, including the portion of the core back assembly, has a mass with a weight that normally urges the subassembly in downward movement relative to the at least one frame, as an incident of which the portion of the core assembly tends to translate downwardly relative to the at least one frame so that the material controlling region tends to move towards the second position.

In one form, the first actuator component interacts with the first arm at one location on the first arm. Another location on the first arm interacts with the subassembly on the core back assembly.

In one form, the second mold unit is configured to engage the first actuator component and move the first actuator component from the starting position into the actuated position as an incident of the first and second mold units being placed in the first operative relationship.

In one form, with the first actuator component in the starting position, the mold units are changed into operative relationship to define the second mold cavity without moving the first actuator component from the starting position into the actuated position.

In one form, two of the mold units each has a receptacle into which a part of the first actuator component extends with the two mold units in operative relationship.

In one form, the subassembly has a platform. The portion of the core back assembly projects upwardly from the platform.

In one form, the portion of the core back assembly is guided in vertical movement by one of the mold units.

In one form, the core back assembly has a second arm and a second actuator that are the same as, and perform in the same manner as, the first arm and first actuator.

In one form, the at least one frame is made up of the one frame and a second frame. The first material is injected into the first mold cavity with the first and second mold units on the first frame. The second material is injected into the mold units defining the second mold cavity on the second frame.

In one form, the invention is directed to an injection molding assembly including a frame and a core back assembly on the frame having a material controlling region. The core back assembly has first and second states. The material controlling region is: i) in a first position with the core back assembly in the first state; and ii) in a second position with the core back assembly in the second state. First and second mold units are configured to be placed in an operative relationship on the frame wherein the first and second mold units cooperate to form a mold cavity on the frame. The frame, core back assembly, and first and second mold units are configured so that the state of the core back assembly is changed as an incident of the first and second mold units being placed in the operative relationship.

In one form, the core back assembly changes from the second state into the first state as an incident of the first and second mold cavities being placed in the operative relationship. With the core back assembly in the first state, a part of the material controlling region projects into the mold cavity.

In one form, the core back assembly includes a first arm on the frame that is guided in pivoting movement relative to the frame around a first axis and a first actuator component. The first actuator component is movable between a starting position and an actuated position. The core back assembly is: a) in the first state with the first actuator component in the actuated position; and b) in the second state with the first actuator component in the starting position. As an incident of the first actuator component changing from the starting position into the actuating position, the first arm pivots in one direction around the first axis and thereby causes the portion of the core back assembly to translate in the path to thereby move the material controlling region from the second position into the first position.

In one form, a subassembly on the core back assembly, including the portion of the core back assembly, has a mass with a weight that normally urges the subassembly in downward movement relative to the frame, as an incident of which the portion of the core assembly tends to translate downwardly relative to the frame so that the material controlling region tends to move towards the second position.

In one form, the first actuator component interacts with the first arm at one location on the first arm. Another location on the first arm interacts with the subassembly on the core back assembly.

In one form, the second mold unit is configured to engage the first actuator component and move the first actuator component from the starting position into the actuated position as an incident of the first and second mold units being placed in the first operative relationship.

In one form, the invention is directed to an injection molding assembly having a frame and a core back assembly on the frame with a material controlling region. The core back assembly has first and second states. The material controlling region is: i) in a first position with the core back assembly in the first state; and ii) in a second position with the core back assembly in the second state. First and second mold units are configured to be placed in an operative relationship on the frame wherein the first and second mold units cooperate to form a mold cavity on the frame. The frame, core back assembly, and first and second mold units are configured so that the second state of the core back assembly is maintained as an incident of the first and second mold unit being placed in the operative relationship.

BRIEF DESCRIPTION OF THE DRAWINGS

FIG. 1 is a plan view of a conventional discrete part that can be made using a two-shot injection molding process;

FIG. 2 is a cross-sectional view of the discrete part taken along line 2-2 of FIG. 1;

FIG. 3 is a plan view of a first portion of the discrete part in FIGS. 1 and 2 formed by injection of a first material and in relationship to a core back assembly with a material controlling region thereon in a first position during molding of the first portion;

FIG. 4 is a cross-sectional view of the first part portion and core back assembly taken along line 4-4 of FIG. 3;

FIG. 5 is a view as in FIG. 4 with the material controlling region on the core back assembly changed from the first position of FIGS. 3 and 4 into a second position;

FIG. 6 is a cross-sectional view of the first portion of the part and core back assembly taken along line 6-6 of FIG. 5;

FIG. 7 is a view as in FIG. 5 wherein a second material has been injection molded around the first portion;

FIG. 8 is a cross-sectional view of the part and core back assembly taken along line 8-8 of FIG. 7;

FIG. 9 is a view as in FIG. 7 with the part separated from the mold and core back assembly;

FIG. 10 is a cross-sectional view of the part taken along line 10-10 of FIG. 9 and with a bridge piece broken off therefrom;

DETAILED DESCRIPTION OF THE PREFERRED EMBODIMENT

The present invention is directed to addressing one or more of the problems identified above in the prior art.

Figure 11:
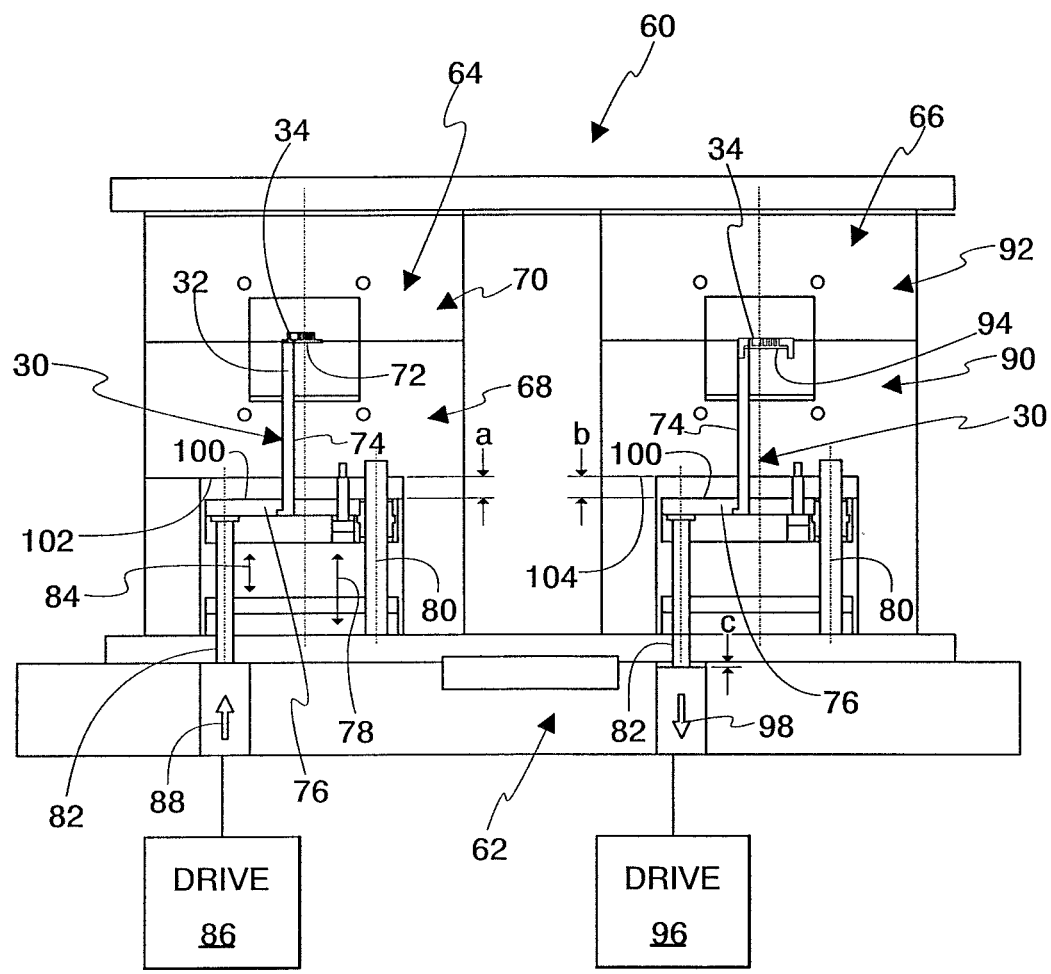
FIG. 11 is a front elevation view of a conventional molding system usable to carry out the molding process as shown in FIGS. 1-10.
Figure 12:
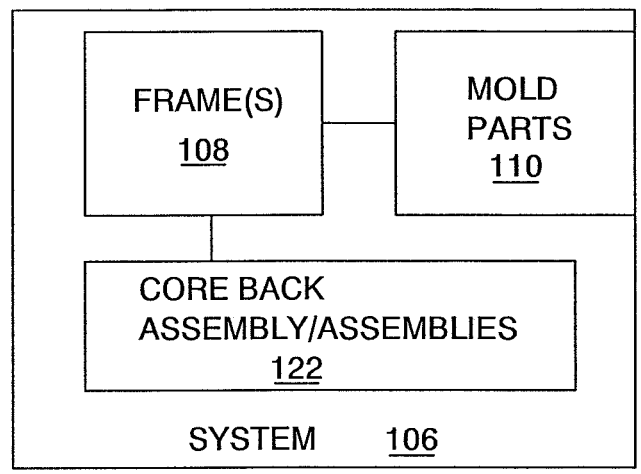
FIG. 12 is a schematic representation of a system for molding discrete parts according to the invention.

The present invention is not concerned with the details of how parts on mold units, or mold units themselves, are configured, cooperate, or are relatively moved to form two different mold cavity configurations. A single station might be provided at which both injection shots occur. Alternatively, two separate stations might be utilized. A generic showing of a molding system, according to the invention, to encompass all contemplated different versions, is shown in FIG. 12 at 106. The system 106 consists of at least one frame 108 on which mold parts 110 are operatively connected to produce mold units that form the different cavities required to perform the two-shot injection molding operation. The generic showing is intended to cover all known mold unit constructions, all different mold piece constructions, and any cooperation therebetween that may produce different mold cavity configurations in which material can be serially injected.

Figure 13:
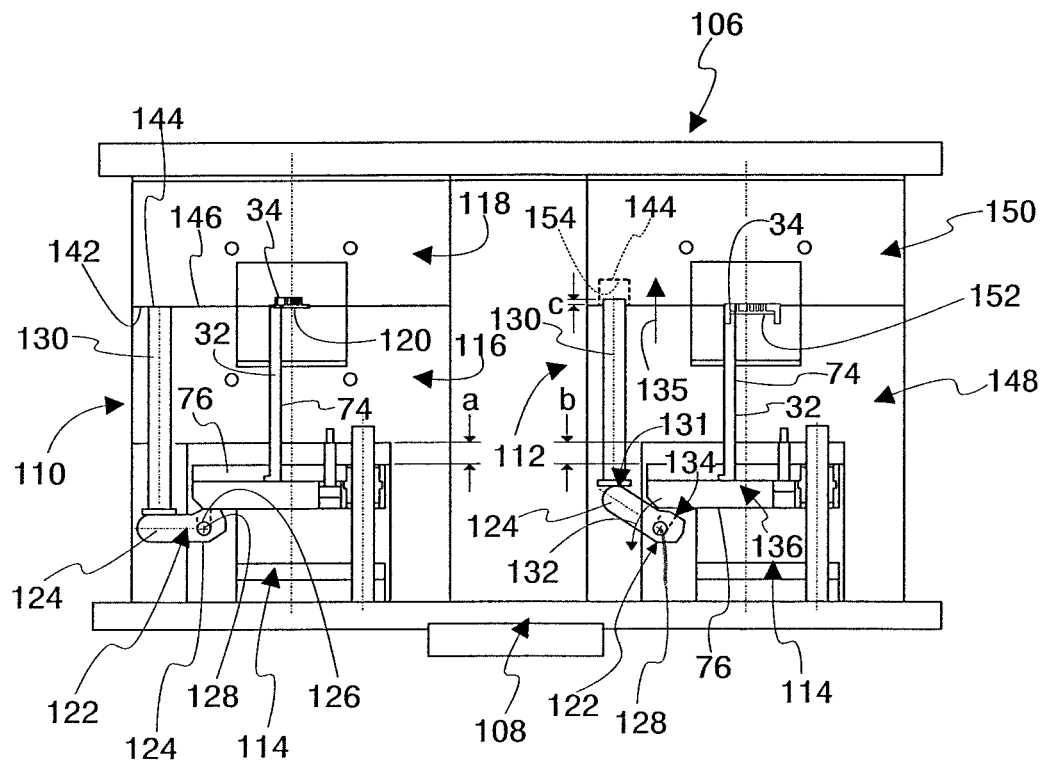
FIG. 13 is a front elevation view of an exemplary form of the inventive system as shown schematically in FIG. 12.

In FIG. 13, a more specific form of the inventive system 106 is depicted. The system 106 has a frame 108 which has associated first and second stations 110, 112, at which first and second injection molding steps are performed. As noted above, the frame portions 114 at each station 110, 112 are the same.

At the first station 110, first and second mold units 116, 118 are shown in operative relationship on the frame 108 wherein the mold units 116, 118 define a first mold cavity 120 corresponding to the shape of the first part portion 18. A core back assembly 122, also shown schematically in FIG. 12, has first and second states, shown respectively at the first station 110 and the second station 112. The core back assembly 122 incorporates the same body 74 and platform 76 as used in the prior art system described above. The body 74 has the same material controlling region 34.

The core back assembly 122 differs from the prior art core back assembly 30 primarily in the manner in which the core back assembly 122 is operated to change the vertical positions of the platform 76 and body 74.

More specifically, the core back assembly 122 has an arm 124 on the frame 108 that is guided by a pin 126 for pivoting movement relative to the frame 108 around an axis 128.

The core back assembly 122 has an actuator component 130 movable between a starting position, as shown at the station 112, and an actuated position, as shown at the station 110. The core back assembly 122 is in the first state with the actuator component 130 in the actuated position and in the second state with the actuator component 130 in the starting position.

As an incident of the actuator component 130 changing from the starting position into the actuated position, by guided downward translation in a path, the arm 124 is engaged by the moving actuator component 130 at a first location 131 and is thereby caused to pivot in the direction of the arrow 132 around the axis 128. The pivoting arm 124, at a second location 134 thereon, cams the platform 76 upwardly in the direction of the arrow 135 from the position it is shown to occupy at the second station 112 into the position it is shown to occupy at the first station 110. As a result, the material controlling region 34 changes from its second position into its first position.

The body 74 and platform 76 define a subassembly 136 having a mass with a weight that normally urges the subassembly 136 downwardly relative to the frame 108, as an incident of which the portion 32 of the core back assembly 122 tends to translate downwardly, causing the material controlling region 34 to be urged normally towards its second position.

The second mold unit 118 is configured to engage the actuator component 130 and move the actuator component from its starting position into its actuated position as an incident of the first and second mold unit 116, 118 being placed in operative relationship. As depicted, the mold unit 118 has a surface 142 that bears on the end 144 of the actuator component 130 as the surface 142 on the mold part 118 and oppositely facing surface 146 on the mold unit 116 are drawn towards each other to achieve their operative relationship and form the first mold cavity 120.

Third and fourth mold units 148, 150 at the second station 112 are placed in the operative relationship shown to form the second molding cavity 152. The mold unit 150 has a receptacle 154 into which the end 144 of the actuator component 130 can extend with the mold units 148, 150 moved into operative relationship. Accordingly, with the core back assembly 122 in its second state, this state will be maintained as the mold units 148, 150 are moved into operative relationship. In other words, the actuator component 130 is not moved from, and is maintained in, the starting position as this action occurs.

Each of the actuator component 130 and body 74 is guided in a vertical translatory path by the frame 108 and within a receptacle on the mold unit 116, 148 through which it extends.

In this embodiment, the frame 108 is defined as including the frame parts 114. However, the frame parts 114 may be considered separate and independent frames. Alternatively, as noted above, a single frame, as shown at one of the stations 114, may be used to effect the two-shot molding by simply rearranging the mold parts 110 as shown in the generic form of the invention in FIG. 12.

In FIG. 13, the movement range a is equal to the difference between the distances b, c (b−c).

With the structure depicted, the core back assembly 122 can be changed between its first and second states without requiring separate, independent actuators as in the prior art, described above.

Figure 14:
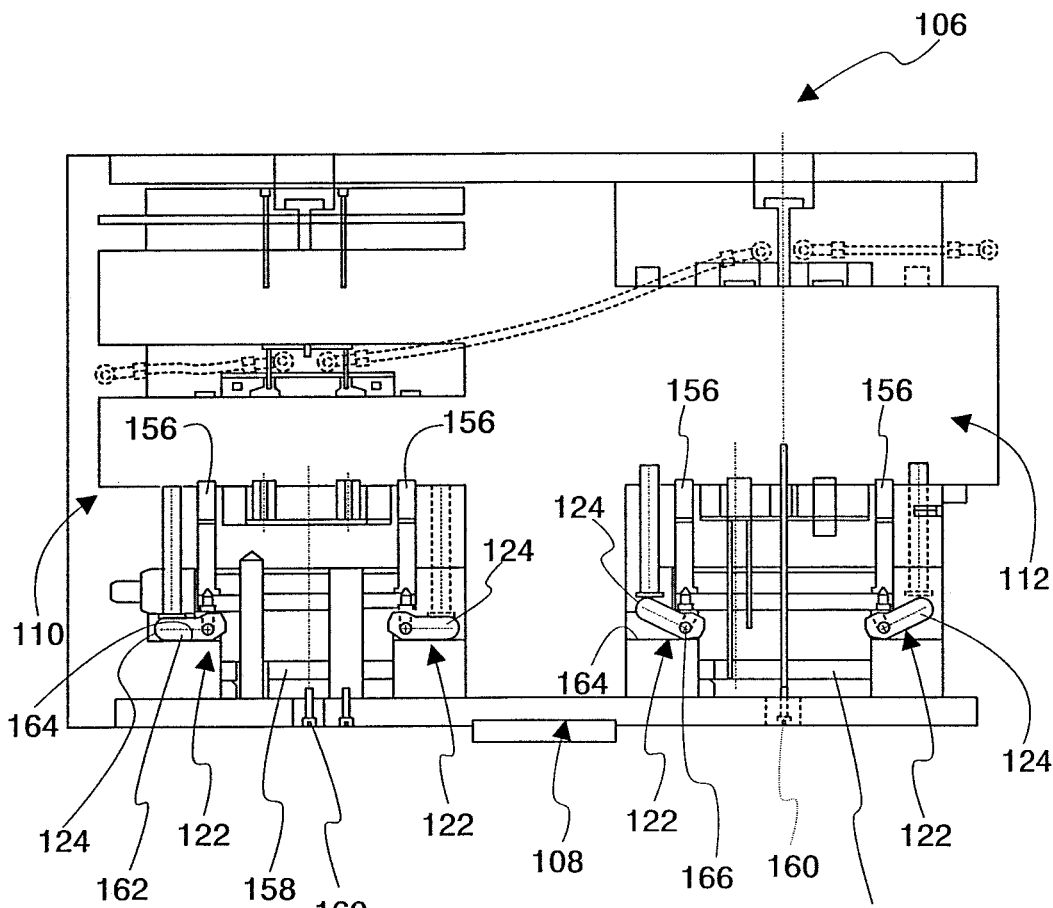
FIG. 14 is a view as in FIG. 13 and showing additional detail of the system.

FIG. 14 shows the basic system 106 in FIG. 13 with some additional detail, including additional core back assemblies 122 that cooperate at each station 110, 112. At each station, core back return pins 156 are provided and can engage mold unit surfaces, recessed and otherwise, to limit pivoting of the arm 124. Ejector plates 158 are also shown with conventional ejector pins 160.

To consistently locate and maintain the different states for the core back assemblies 122, each arm 124 has: a) a flat surface 162 to facially engage a surface 164 on the frame with the core back assembly 122 in the first state, as at the station 110; and b) a separate flat surface 166 to bear on that same frame surface 164 with the core back assembly 122 in the second state, as at the station 112.

It should be understood that the generic showing of the system 106 in FIG. 12 is intended to encompass virtually an unlimited number of variations in the components shown in the exemplary embodiments and their interaction. For example, the core back assemblies may have many different forms so long as the state of the core back assemblies is controlled by the relative movement of the mold parts 110 and associated mold cavity. The depicted forms are only exemplary in nature.

Figure 15:
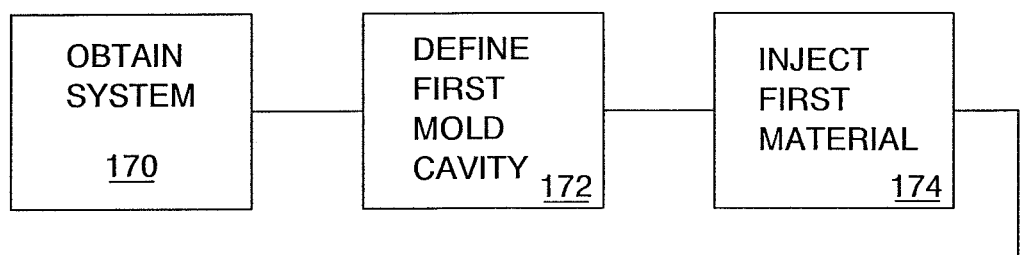
FIG. 15 is a flow diagram representation of a method of injection molding a discrete part using the inventive molding system.
Figure 15:
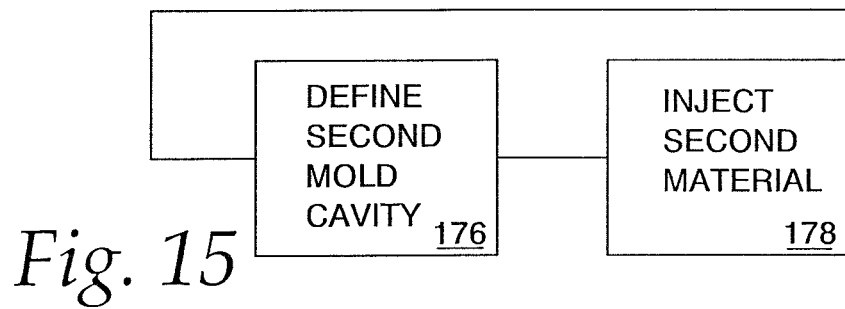

With the above described structure, a method of injection molding a discrete part can be carried out as shown in flow diagram form in FIG. 15.

As shown at block 170, a system as described above is obtained.

As shown at block 172, first and second mold units are placed into a first operative relationship on the frame, as an incident of which the core back assembly is either changed into or maintained in the first state and the first and second mold units define a first mold cavity.

As shown at block 174, a first material is injected into the first mold cavity to form a first portion of the discrete part with first and second spaced openings.

As shown at block 176, either the first and second mold units are placed in a second operative relationship or a third mold unit is placed into operative relationship with at least one of the first and second mold units and/or a fourth mold unit to thereby define a second mold cavity with a different configuration than the first mold cavity in which at least a part of the first portion of the discrete part resides, and thereby either changing the core back assembly into its second state or maintaining it in the second state.

As shown at block 178, a second material, having a characteristic different than the first material, is injected into the second mold cavity in a manner whereby the second material moves in a path between and through the first and second openings to against the first portion of the discrete part at spaced locations.

The foregoing disclosure of specific embodiments is intended to be illustrative of the broad concepts comprehended by the invention.

The invention claimed is:

1. A method of injection molding a discrete part, the method comprising the steps of:
   obtaining a molding system composing:
   a) at least one frame;
   b) at least first and second mold units that are configured to cooperate to form two different mold cavity configurations; and
   c) a core back assembly on each of the at least one frame and comprising a material controlling region,
   the core back assembly having first and second states with the material controlling region: i) in a first position with the core back assembly in the first state; and ii) in a second position with the core back assembly in the second state;
   placing the first and second mold units in a first operative relationship on the one frame as an incident of which the core back assembly is either changed into or maintained in the first state and the first and second units define a first mold cavity with a first configuration;
   injecting a first material into the first mold cavity to form a first portion of the discrete part,
   wherein the material controlling region defines first and second spaced openings in the first portion of the discrete part;
   either: a) placing the first and second mold units in a second operative relationship on the one frame or a second of the at least one frame; or b) placing a third mold unit in an operative relationship with at least one of the first and second mold units and/or a fourth mold unit on the one frame or a second of the at least one frame to thereby define a second mold cavity with a different configuration than the first mold cavity in which at least a part of the first portion of the discrete part resides and as an incident of which the core back assembly is either changed into or maintained in the second state; and
   injecting a second material having a characteristic different than the first material into the second mold cavity and thereby causing the second material to move in a path between and through the first and second openings to against the first portion of the discrete part at spaced locations,
   wherein the core back assembly comprises a portion including the material controlling region that moves as one piece and the portion of the core back assembly translates in a path relative to the at least one frame as the core back assembly is changed between the first and second states,
   wherein the core back assembly comprises a first arm on the at least one frame that is guided in pivoting movement relative to the at least one frame around a first axis and a first actuator component, the first actuator component movable between a starting position and an actuated position, the core back assembly: a) in the first state with the first actuator component in the actuated position; and b) in the second state with the first actuator component in the starting position,
   whereby as an incident of the first actuator component changing from the starting position into the actuated position the first arm pivots in one direction around the first axis and thereby causes the portion of the core back assembly to translate in the path to thereby move the material controlling region from the second position into the first position.

2. The method of injection molding a discrete part according to claim 1 wherein the material controlling region comprises first and second projections around which the first material is formed and configured so that the first and second openings extend fully through the first portion of the discrete part.

3. The method of injection molding a discrete part according to claim 1 wherein the material controlling region in the second state guides the injected second material between the first and second spaced openings in the first portion of the discrete part.

4. The method of injection molding a discrete part according to claim 1 wherein the first and second materials have different characteristics by reason of having at least one of: a) different colors; and b) different compositions.

5. The method of injection molding a discrete part according to claim 1 wherein a subassembly on the core back assembly, including the portion of the core back assembly, has a mass with a weight that normally urges the subassembly in downward movement relative to the at least one frame as an incident of which the portion of the core assembly tends to translate downwardly relative to the at least one frame so that the material controlling region tends to move towards the second position.

6. The method of injection molding a discrete part according to claim 5 wherein the first actuator component interacts with the first arm at one location on the first arm and another location on the first arm interacts with the subassembly on the core back assembly.

7. The method of injection molding a discrete part according to claim 6 wherein the second mold unit is configured to engage the first actuator component and move the first actuator component from the starting position into the actuated position as an incident of the first and second mold units being placed in the first operative relationship.

8. The method of injection molding a discrete part according to claim 7 wherein with the first actuator component in the starting position changing the mold units into operative relationship to define the second mold cavity without moving the first actuator component from the starting position into the actuated position.

9. The method of injection molding a discrete part according to claim 8 wherein two of the mold units each has a receptacle into which a part of the first actuator component extends with the two mold units in operative relationship.

10. The method of injection molding a discrete part according to claim 9 wherein the core back assembly comprises a second arm and a second actuator that are the same as, and perform in a same manner as, the first arm and first actuator.

11. The method of injection molding a discrete part according to claim 5 wherein the subassembly comprises a platform and the portion of the core back assembly projects upwardly from the platform.

12. The method of injection molding a discrete part according to claim 11 wherein the portion of the core back assembly is guided in vertical movement by one of the mold units.

13. The method of injection molding a discrete part according to claim 1 wherein the at least one frame comprises the one frame and a second of the at least one frame and the first material is injected into the first mold cavity with the first and second mold units on the first frame and the second material is injected into the mold units defining the second mold cavity on the second frame.

* * * * *